United States Patent
Hisada et al.

(10) Patent No.: US 6,726,953 B2
(45) Date of Patent: Apr. 27, 2004

(54) METHOD FOR DEPOSITING METAL HAVING HIGH CORROSION RESISTANCE AND LOW CONTACT RESISTANCE AGAINST CARBON ON SEPARATOR FOR FUEL CELL

(75) Inventors: Wataru Hisada, Nagoya (JP); Hiroshi Kihira, Futtsu (JP)

(73) Assignees: Sintobrator, Ltd., Aichi-Ken (JP); Nippon Steel Corporation, Tokyo (JP)

( * ) Notice: Subject to any disclaimer, the term of this patent is extended or adjusted under 35 U.S.C. 154(b) by 269 days.

(21) Appl. No.: 09/748,490

(22) Filed: Dec. 26, 2000

(65) Prior Publication Data

US 2001/0006702 A1 Jul. 5, 2001

(30) Foreign Application Priority Data

Dec. 27, 1999 (JP) ............................................. 11-369817
Jun. 29, 2000 (JP) ....................................... 2000-196526

(51) Int. Cl.[7] ................................................. B05D 5/12
(52) U.S. Cl. ...................... 427/115; 427/180; 427/189; 427/421; 427/11; 29/623.5
(58) Field of Search ........................ 29/623.5; 427/115, 427/348, 11, 421, 180, 189, 190, 191

(56) References Cited

U.S. PATENT DOCUMENTS 3,754,976 A * 8/1973 Babecki et al. ............. 117/105
4,714,622 A * 12/1987 Omori et al. ................. 427/11
5,330,790 A * 7/1994 Calkins ....................... 427/204
5,516,586 A * 5/1996 Singer et al. ................ 428/433
6,015,586 A * 1/2000 Omori et al. .................. 427/11

FOREIGN PATENT DOCUMENTS

EP       556065 A1  *  8/1993
EP       911425     *  4/1999
JP       10-228914      8/1998

OTHER PUBLICATIONS

"Cold Spray Direct Fabircation—High rate, Solid State, Material Consolidation", Smith et al., Meeting of the Material Research Society, Boston, Ma, Fall 1998, pp. 1–12.*

* cited by examiner

Primary Examiner—Brian K. Talbot
(74) Attorney, Agent, or Firm—Kenyon & Kenyon

(57) ABSTRACT

A method for depositing a metal having a high corrosion resistance and a low contact resistance against carbon to a separator for a fuel cell enabling provision of an inexpensive separator for a fuel cell by depositing a metal having a high corrosion resistance and a low contact resistance against carbon to the surface of a metal conveniently by simple equipment while using as a preform a metal such as stainless steel or aluminum as a material having a high productivity and low price and in addition capable of reducing the weight by making the sheet thickness thin, comprising projecting to a separator of a unit cell for forming the fuel cell a solid plating material comprised of core particles having a higher hardness than the separator and coated with a metal having a high corrosion resistance and a low contact resistance against carbon so as to compulsorily deposit the metal coated on this solid plating material to the separator.

11 Claims, 2 Drawing Sheets

METHOD FOR DEPOSITING METAL HAVING HIGH CORROSION RESISTANCE AND LOW CONTACT RESISTANCE AGAINST CARBON ON SEPARATOR FOR FUEL CELL

BACKGROUND OF THE INVENTION

1. Field of the Invention

The present invention relates to a method for depositing a metal having a high corrosion resistance and a low contact resistance against carbon to a separator of a unit cell for forming a fuel cell.

2. Description of the Related Art

As a fuel cell, there are a solid polymer type fuel cell, a phosphoric acid type fuel cell, a molten carbonate type fuel cell, an alkali type fuel cell, etc. These fuel cells use different electrolytes, but acquire electromotive force by an electrochemical reaction of hydrogen and oxygen. A fuel cell is formed by stacked unit batteries (cells) and a separator for electrically connecting cells and for separating a reaction gas fed to the cells disposed between adjoining cells.

As this separator, a carbon material has been mainly used. With carbon, however, the required separator shape has been obtained by a shaving from a preform or pressurized powder shaping or the like. Accordingly, the productivity was low and the manufacturing cost high. Further, a separator made of titanium has been partially used as a separator made of metal, but titanium is an expensive material, so there is a limit in lowering of costs.

Therefore, a separator using as a preform a metal such as stainless steel or aluminum, which are materials having a high productivity and a low cost and which enable of reduction a weight by making the sheet thickness smaller has been proposed in Japanese Unexamined Patent Publication (Kokai) No. 10-228914 etc. When using a metal as a preform, in order to lower the contact resistance against the carbon electrode or carbon paper forming a current collector and then impart corrosion resistance, it is necessary to plate it with a precious metal. This plating must be done immediately after removal of a passive film unlike with usual plating. Therefore, in a case of a wet type, there was a problem in that many steps such as degreasing, washing, surface activation, washing, plating, washing, and drying had to be passed. The hardware per se became large in size in physical vapor deposition (PVD) and chemical vapor deposition (CVD).

SUMMARY OF THE INVENTION

An object of the present invention is to provide a method for depositing a metal having a high corrosion resistance and a low contact resistance against carbon to a separator for a fuel cell enabling provision of an inexpensive separator for a fuel cell by depositing a metal having a high corrosion resistance and a low contact resistance against carbon to the surface of a metal conveniently by simple equipment while using as a preform a metal such as stainless steel or aluminum as a material having a high productivity and low price and in addition capable of reducing the weight by making the sheet thickness thin.

According to the present invention, there is provided a method of depositing a metal having a high corrosion resistance and a low contact resistance against carbon on a separator for a fuel cell, the method comprising the steps of projecting to a separator of a unit cell for forming the fuel cell a solid plating material comprised of core particles having a higher hardness than the separator and coated with a metal having a high corrosion resistance and a low contact resistance against carbon so as to compulsorily deposit the metal coated on this solid plating material to the separator.

Preferably, a projection velocity of the solid plating material to the separator is made 20 to 100 m/sec.

Preferably, the projection of the solid plating material to the separator is performed by a flow of dry air. Alternatively, the projection of the solid plating material is performed by a rotating impeller. Alternatively, the projection of the solid plating material is performed by a flow of water. Alternatively, the projection of the solid plating material is performed by a flow of inert gas.

More preferably, the core particles of the solid plating material have a particle size of 30 to 300 $\mu$m, a true specific gravity of 2 to 15, and a hardness of 400/2000 Hv.

Still more preferably, the core particles of the solid plating material are made of hard metal.

Still more preferably, the metal having a high corrosion resistance and a low contact resistance against carbon to be coated on the core particles of the solid plating material is a single metal or an alloy.

Still more preferably, the metal having a high corrosion resistance and a low contact resistance against carbon to be coated on the core particles of the solid plating material is at least one of gold, silver, copper, and nickel.

Still more preferably, the carbon contact resistance value is not more than 20 m$\Omega \cdot$cm$^2$ at a contact pressure of at least 1 kg·f/cm$^2$.

BRIEF DESCRIPTION OF THE DRAWINGS

These and other objects and features of the present invention will become clearer from the following description of the preferred embodiments given with reference to the accompanying drawings, wherein.

DESCRIPTION OF THE PREFERRED EMBODIMENTS

Figure 1:
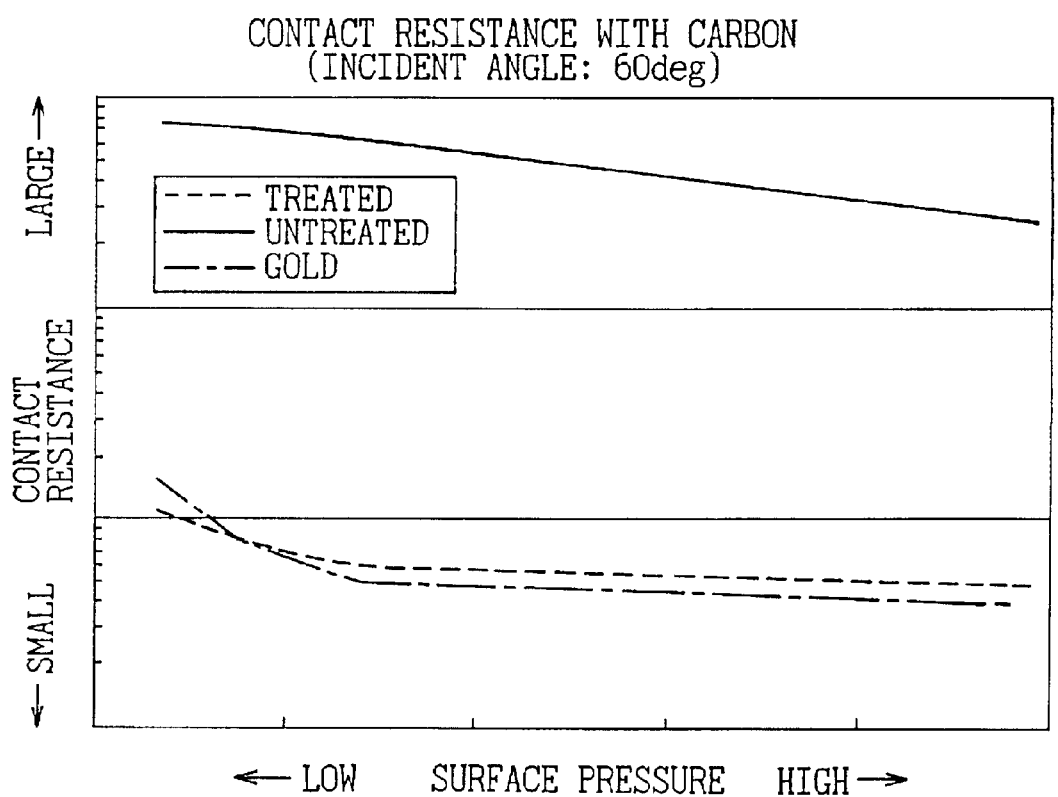
FIG. 1 is a graph of the relationship between face pressure and a contact resistance value in experimental results of Example 1 of the present invention and a comparative specimen and FIG. 2 is a graph of the relationship between face pressure and a contact resistance value in experimental results of Example 2 of the present invention and a comparative specimen.

The present invention provides a method of depositing a metal having a high corrosion resistance and a low contact resistance against carbon on a separator for a fuel cell comprising the steps of projecting to a separator of a unit cell for forming the fuel cell a solid plating material comprised of core particles having a higher hardness than the separator coated with a metal having a high corrosion resistance and a low contact resistance against carbon so as to compulsorily deposit the metal coated on this solid plating material to the separator.

According to the method of the present invention, the solid plating material has a higher hardness than the separator material. Therefore, if the solid plating material strikes upon the separator material, first the passivation film at the surface of the separator material is destroyed and the true surface of the preform appears. At the same time, adequate surface roughening (anchor pattern effect) occurs, plastic deformation mechanically occurs in the coating material of the solid plating material by this anchor portion (scratching effect), the coating material is compulsorily deposited to the preform true surface of the separator, the deposited coating material is rolled by the projection pressure by the core particles, and thus a uniform coating layer is formed on the surface of the separator material.

Note that if instead of using the solid plating material as described above, a solid plating material with all particles made of a soft material such as gold or silver is projected, even if it strikes the separator material, it cannot sufficiently destroy the passivation film at the surface of the separator material. In addition, the anchor pattern effect cannot be obtained. Further, a precious metal such as gold and the silver is expensive. Therefore, the destruction of the passivation film and the formation of the low contact resistance layer aimed at by the present invention cannot be simultaneously conveniently carried out.

Further, in the present invention, the projection velocity of the solid plating material is selected within a range of 20 to 100 m/sec according to the material of the core particles. The reason for this is that there is an optimum combination of the thickness and strength of the passivation film, the thickness of the preform and the hardness and the true specific gravity of the core particles according to the material of the separator. For example, in the case where the core particles are hard metal, they have a high hardness and a high specific gravity, so can sufficiently function even at a low velocity, but preferably it is about 20 to 40 m/sec when considering the running cost and deformation of the separator or the like. In contrast, when the core particles have a medium hardness and a low specific gravity such as glass beads, efficient processing cannot be carried out unless the velocity is set higher than the former within a range up to 100 m/sec.

Further, in the present invention, the acceleration medium of the solid plating material may be any of a flow of dry air, an impeller, a flow of water, and a flow of inert gas so far as the flow rate and the projection velocity of the solid plating material can be controlled, but a flow of dry air is most suitable when considering the flow rate of the solid plating material, the control of the projection velocity, economy, and workability.

Note that if the solid plating material is accelerated and strikes the separator surface as in the present invention, there is also a cleaning effect, so the method can be executed by omitting a pretreatment step in the case of a slightly contaminated separator surface.

Below, the present invention will be explained further using examples given in comparison with comparative specimens.

Known Specimens

First, carbon paper was held between two specimens of gold plates having the same area as the carbon paper. Various loads were applied between the two gold plates to change the face pressure, a constant current was supplied between the two gold plates, and the voltage at that time was measured. Then, the current density was calculated from the area of each specimen and the face resistivity at each face pressure was calculated from the measurement result of each specimen so as to obtain the contact resistance value between the gold and the carbon paper.

Next, carbon paper of the same area as the specimen was held between a specimen of stainless steel plate (JIS SUS316) having the same area as the gold plates described above and polished to a mirror finish and a gold plate the same as one of the gold plates described above. A contact current was supplied between this stainless steel plate and the gold plate and the voltage at that time was measured. The contact resistance value between the stainless steel plate and the carbon paper was calculated from the results thereof in a similar way to that described above.

EXAMPLE 1

A solid plating material obtained using hard metal particles of 100 $\mu$m size as core particles, using gold as the coating material, and directly plating this gold on the surface of the core particles was obtained for use in the present invention. On the other hand, as the preform acting as the separator, use was made of a test piece for measuring the contact resistance obtained by mirror polishing a disk made of stainless steel plate (JIS SUS316) having a diameter of 30 mm and a thickness of 4 mm. The solid plating material was accelerated toward the surface with an air pressure of 0.4 MPa, projected at conditions of a velocity of 35 m/min and an incident angle of 60 degrees, and struck the surface of the test piece for measuring the contact resistance to obtain a test piece with a uniform coating of gold formed on the surface of the test piece.

When measuring the contact resistance value of this test piece and the carbon paper at a contact pressure of 1 kg·f/cm$^2$ and calculating by a method similar to that of the case of when preparing the known specimens, the result became less than 20 m$\Omega$·cm$^2$ or about $\frac{1}{100}$ of the contact resistance value between the untreated stainless steel plate of the known specimen and carbon paper at a contact pressure of 1 kg·f/cm$^2$.

EXAMPLE 2

Use was made of a solid plating material and a test piece for measuring the contact pressure serving as the preform acting as the separator the same as those of Example 1. The solid plating material was accelerated toward the surface of this test piece with an air pressure of 0.4 MPa and struck at a velocity of 35 m/min and an incident angle of 45 degrees. As a result, a test piece for measuring the contact resistance with a uniform coating of gold formed on the surface of the test piece was obtained.

When measuring the contact resistance value of this test piece and the carbon paper at a contact pressure of 1 kg·f/cm$^2$ and calculating by a method similar to that of the case of when preparing the known specimens, the result became less than 20 m$\Omega$·cm$^2$ or about $\frac{1}{100}$ of the contact resistance value between the untreated stainless steel plate used as the known specimen and carbon paper at a contact pressure of 1 kg·f/cm$^2$.

Figure 2:
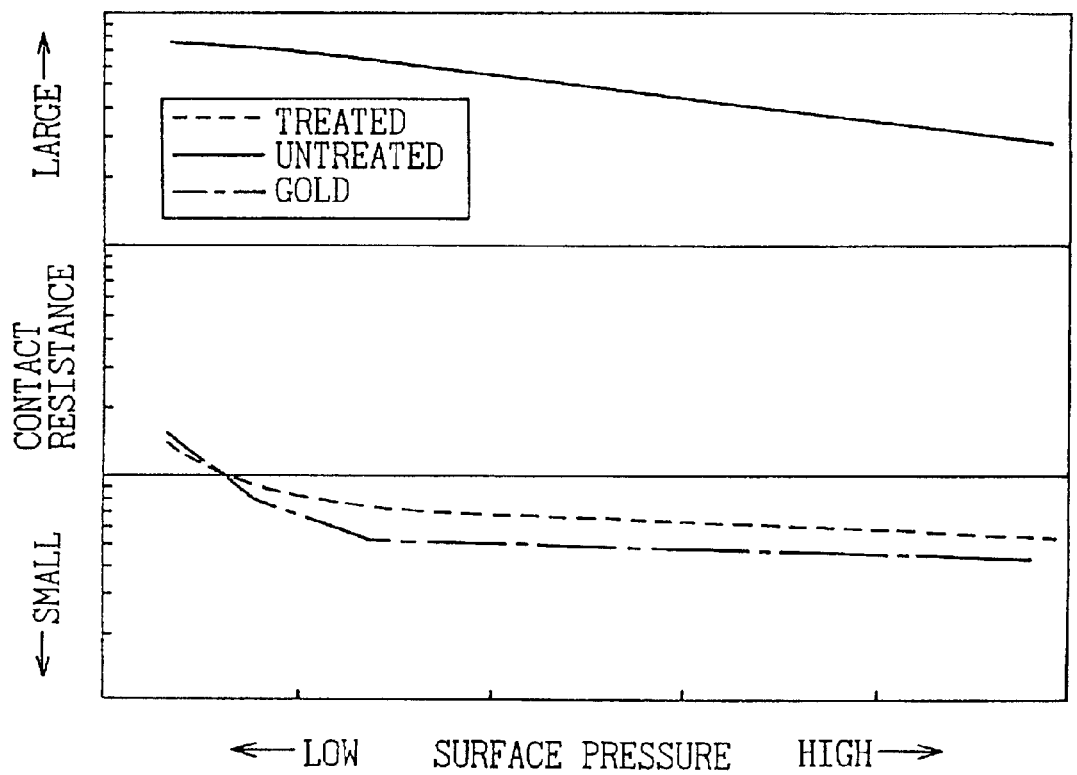

The contact resistance values between the gold described above as the known specimens and the carbon at the different face pressures and the contact resistance values between the untreated stainless steel and carbon at the different face pressures and also the contact resistance values at the different face pressures in Example 1 and Example 2 treated by the method of the present invention are shown in FIG. 1 and FIG. 2.

According to experiments, the contact resistance value obtained by the processing by the method of the present invention was 3 to 5 $\Omega$·cm$^2$ at the maximum face pressure 10 kg·f/cm$^2$ of the present test. This is about $\frac{1}{100}$ with respect to the contact resistance value between the untreated stainless steel explained as the known specimen and carbon at the same contact pressure, i.e., 300 to 500 m$\Omega$·cm$^2$ and substantially equivalent to the contact resistance value of 3 to 4 m$\Omega$·cm$^2$ between the gold explained as the known specimens and carbon at the same contact pressure.

As apparent from the above explanation, the present invention has the advantages that when forming gold or another metal coating of a high corrosion resistance and a low contact resistance against carbon on a preform made of a metal having a high productivity and low cost such as stainless steel or aluminum used as the separator of a unit cell for forming a fuel cell, there is the advantage that the processing becomes possible at a high productivity and with a simple method without wet type plating which requires a complex process and large system and in addition requires trouble for processing the waste liquor and wastewater.

Accordingly, the present invention greatly contributes to development of the industry as a method for depositing a metal having a high corrosion resistance and a low contact resistance against carbon on the surface of stainless steel, aluminum, or another metal by a simple system and thereby enables provision of a cheap separator for a fuel cell.

While the invention has been described by reference to specific embodiments chosen for purposes of illustration, it should be apparent that numerous modifications could be made thereto by those skilled in the art without departing from the basic concept and scope of the invention.

What is claimed is:

1. A method of depositing a metal having corrosion resistance on a separator for a fuel cell, the method comprising the steps of projecting to a separator of a unit cell for forming the fuel cell, the separator being made of a metallic material with a passivation film on the surface, a solid plating material comprised of hard metal core particles having a higher hardness than the separator and coated with a metal having corrosion resistance and carbon contact resistance of not more than 20 m$\Omega$·cm$^2$ at a contact pressure of at least 1 kg·f/cm$^2$ so as to destroy the passivation film and to compulsorily deposit the metal coated on this solid plating material to the separator.

2. A method as set forth in claim 1, wherein a projection velocity of the solid plating material to the separator is 20 to 100 m/sec.

3. A method as set forth in claim 1, wherein the projection of the solid plating material to the separator is performed by a flow of dry air.

4. A method as set forth in claim 1, wherein the projection of the solid plating material is performed by a rotating impeller.

5. A method as set forth in claim 1, wherein the projection of the solid plating material is performed by a flow of water.

6. A method as set forth in claim 1, wherein the projection of the solid plating material is performed by a flow of inert gas.

7. A method as set forth in claim 1, wherein the core particles of the solid plating material have a particle size of 30 to 300 $\mu$m, a true specific gravity of 2 to 15, and a hardness of 400–2000 Hv.

8. A method as set forth in claim 1, wherein the core particles of the solid plating material are made of metal having a hardness of 400–2000 Hv.

9. A method as set forth in claim 1, wherein the metal having corrosion resistance to be coated on the hard metal core particles of the solid plating material is a single metal or an alloy.

10. A method as set forth in claim 1, wherein the metal having corrosion resistance to be coated on the hard metal core particles of the solid plating material is at least one of gold, silver, copper, and nickel.

11. A method as set forth in claim 1, wherein the hard metal core particles have a particle size of 30–300 $\mu$m.

* * * * *